Oct. 13, 1931.  J. M. BARRETT  1,827,453
DRAINAGE CONTROL SYSTEM
Filed Sept. 17, 1928   2 Sheets-Sheet 1
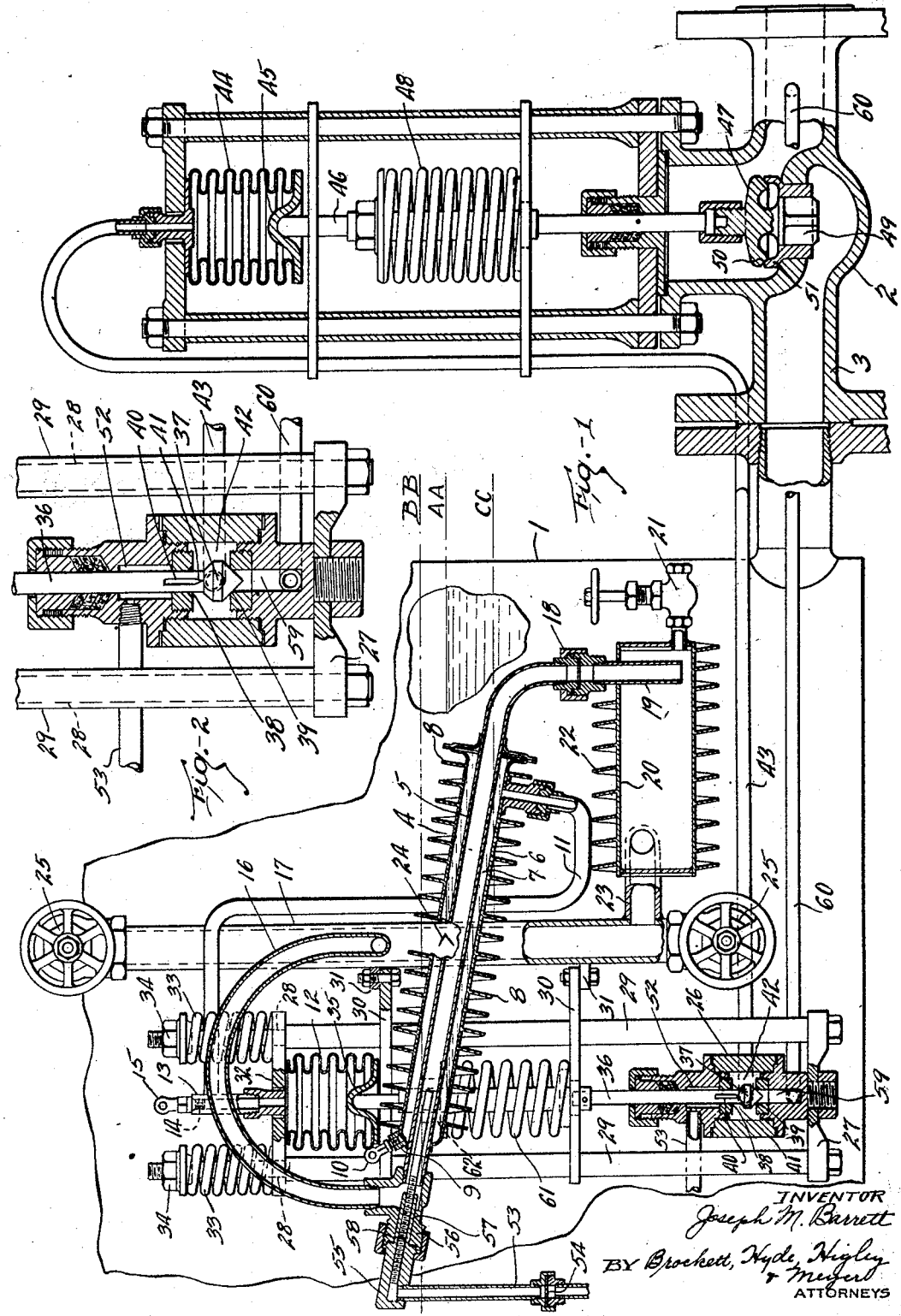
INVENTOR
Joseph M. Barrett
BY Brockett, Hyde, Higley
& Meyert
ATTORNEYS

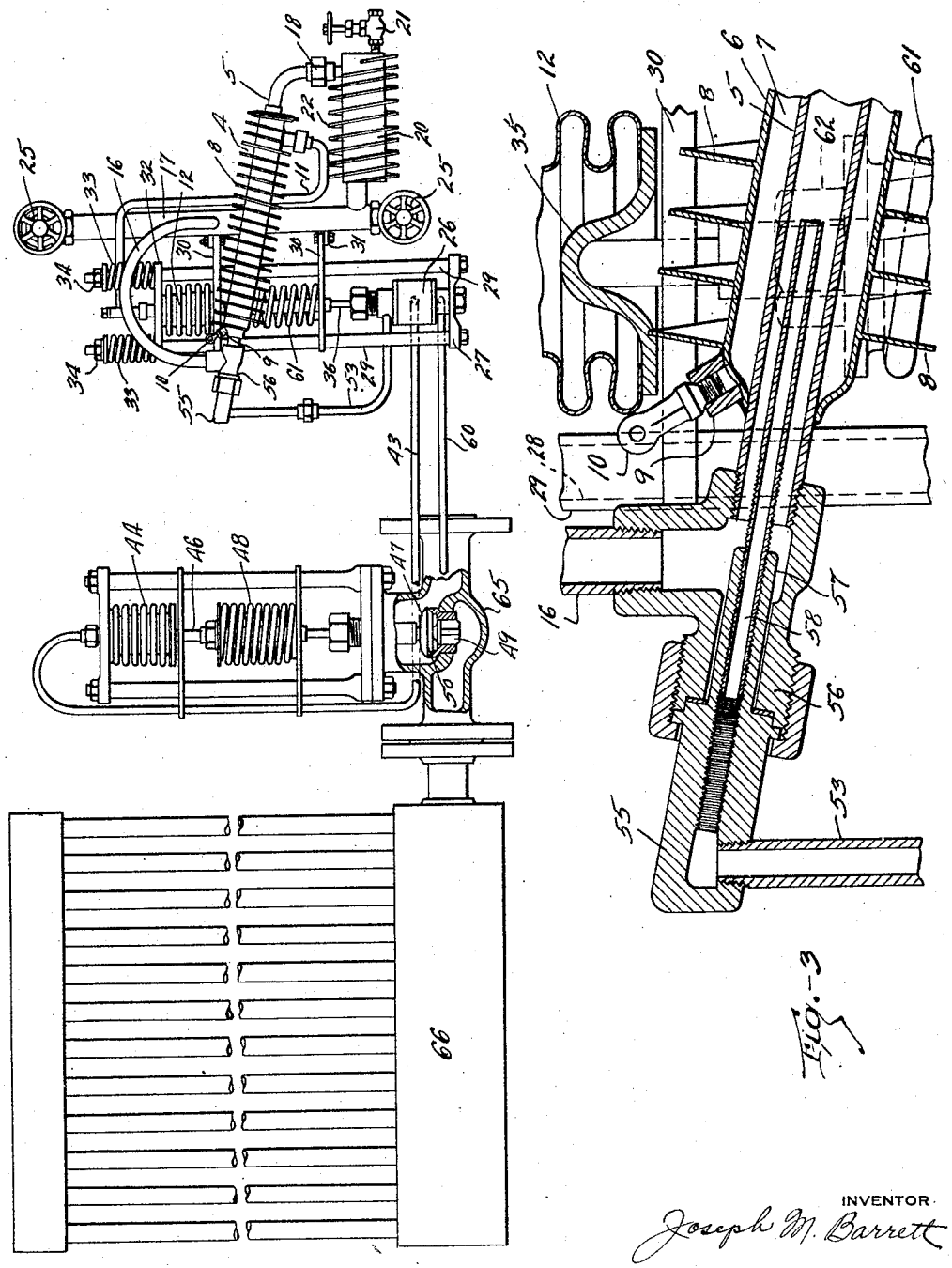

Patented Oct. 13, 1931

1,827,453

UNITED STATES PATENT OFFICE

JOSEPH M. BARRETT, OF CLEVELAND HEIGHTS, OHIO, ASSIGNOR TO BAILEY METER COMPANY, OF CLEVELAND, OHIO, A CORPORATION OF DELAWARE

DRAINAGE CONTROL SYSTEM

Application filed September 17, 1928. Serial No. 306,333.

This invention relates to valve control systems or devices, such as are used for controlling valves for draining condensation from steam lines, feed water regulating valves or valves for other like purposes. While the control system may be used in connection with valves for any of these uses, as well as others, it has been illustrated and will be described with more particular reference to drainage control systems, one usual form of which includes a tank or receiver in which the drainage is collected and from which it is discharged at intervals whenever a sufficient quantity collects.

The present system utilizes a so-called "generator" as a controller for the discharge valve, said generator spanning the normal water level in the receiver and being responsive to variations in said level.

The object of the invention is to provide a valve control system which is prompt in its response to variations in water level, with no lag which might permit excessive water flow or loss of steam; which is adjustable to control or regulate the possible fluctuations in level; which is positive in operation and thereby prevents fluttering of the valve or valves and the consequent wire drawing, loss of steam and like effects; which automatically and positively purges or scavenges the system, and particularly the generator, of air or non-condensable gases, so that it does not become air bound but remains fully operative; and which is not interfered with by the presence of superheated steam or high temperature.

Another object is to provide a generator control system in which the generator and its associated parts may be made up as a self-contained unit capable of convenient installation in any valve control system, with the generator and control devices capable of being made up and kept in stock in one or two sizes each capable of handling a fairly wide range of valve sizes, avoiding the past necessity for practically building to order each controller for each particular valve to be controlled.

A further object is to provide improved valve control mechanism in which the means sensitive to variations in water level does not directly control or actuate the valve, but accomplishes its controlling function by a relay effect, said means controlling an intermediate controller, such as a supplementary or relay control valve, which in turn controls the application of the necessary forces to the main water flow regulating valve; and in connection therewith an expansible metal bellows or motor for said relay valve, which bellows is protected against excessive pressures, either from the generator or as the result of seating movement of the relay valve.

Further objects of the invention are in part obvious and in part will appear more in detail hereinafter.

In the drawings, Fig. 1 is a more or less diagrammatic sectional view, illustrating the complete system as designed for drainage control; Fig. 2 is a detail section, on a larger scale, of the relay control valve; Fig. 3 is a similar view of the upper end of the generator; and Fig. 4 is a diagrammatic view, illustrating one use of the invention as a feed water regulator.

The tank or receiver 1, conventionally shown, will be understood to receive and collect the drainage from one or a series of conduits (not shown). It may have any desired or needful capacity according to the nature of the steam system to which it is connected. The steam pressure of the system is of course effective in the receiver and as the drainage collects its level rises until the main valve 2 is opened in the discharge line 3, which carries the drainage to a sewer or to a collector from which it may be returned to the boiler. The present invention provides a system for controlling the main valve so that when the level of condensate in the receiver rises above a normal level AA by a certain amount, said main valve is caused to open and permit discharge of the condensation until its level falls to a point where the control again responds and closes the valve, as will more fully appear hereafter.

The sensitive controlling element is what is called a "generator" in the sense that it produces or varies the pressure of a fluid, variations in such pressure being utilized for control purposes. The generator shown, marked generally 4, comprises an inner tubular member 5 around which is sleeved an outer shell 6 closed at its opposite ends so as to form a trapped generating chamber 7. The outer shell may be provided with suitable heat radiating means, such as the fins 8, as well as with a filling opening 9 closed by a plug 10 near its upper end, while at its lower end the trapped chamber communicates by a pipe 11 with suitable motor means, such as an expansible metal bellows 12. Variations in pressure in said chamber are therefore effective to expand or contract the bellows, as will be readily understood. The pipe 11 rises above the filling opening 9 and is connected to the bellows by a fitting 13 in which is a filling opening 14 closed by a plug 15. When the generator is installed the plug 10 is removed and a suitable vaporizable liquid, such as water, is poured in to fill the trapped chamber, whereupon the plug 10 is restored to closed position and the remaining parts of the system are filled through the opening 14, which is then closed by its plug. Thereafter, replenishment of the liquid is made through the opening 14, if replenishment is necessary for any reason. Trapped chamber 7, bellows 12 and pipe 11 form a closed system, but the chamber 7 of course is not entirely full, some space being left for the pressure producing vapor, as is usual.

The inner pipe 5 communicates at its opposite ends with the water and steam spaces of the receiver. In other words, it is laid across or spans the normal water level, so that under all conditions rise and fall of the level of liquid in the receiver meets with like rise and fall of the liquid in the inclined part of the pipe 5, thereby subjecting the liquid in the trapped generating chamber to the heating effect of the varying steam zone and the cooling effect of a varying water zone, as the water level fluctuates. For well known reasons the generator is usually placed at an incline to amplify the heat transfer effects, and such effects more or less vaporize the liquid in the trapped generating chamber and produce expansion or contraction of the motive bellows, all as will be readily understood.

The connection of the generator to the receiver to establish communication with the water and steam spaces of the latter is preferably made in such manner as to insure that the generator will inevitably be set at the proper incline in a more or less standard position. To this end the pipe 5 at its upper end communicates by an upwardly arched gooseneck 16 with a vertical pipe 17, the two pipes 16, 17 being rigidly and more or less permanently connected, such as by a welded joint. At its lower end pipe 5 is connected by a union 18 to an open ended pipe 19 entering and extending nearly to the bottom of a cold water well or reservoir 20 consisting of a hollow cylindrical member provided with a valved blow-off connection 21 and provided with suitable heat radiating means, such as the fins 22, and communicating by a pipe 23 likewise rigidly connected as by welding, with the pipe 17. The pipe 17 serves as a support or base by which the generator and its connected parts are supported and the rigid connections of pipes 16 and 23 to pipe 17 establish a definite standard relation between the generator and the supporting pipe 17. Therefore, in installing this control the pipe 17 is set vertically at any desirable place with a suitable indicating mark 24 thereon located at the desired normal water level AA of the receiver or boiler, and when in this position is suitably connected to the receiver or boiler above and below the water line therein by suitable fittings, such as the angle valves 25. Pipe 17, the generator and cooperating parts, including other parts to be later described, therefore form a unit capable of being readily installed in any system to be controlled, with the certainty that all parts are in the proper position and functioning efficiently.

Pipe 17 may also serve as the support for the relay control devices for the main valve, such devices in the present instance including the relay or pilot valve 26. The latter is supported by a cross bar 27 carried by a pair of vertical rods 28 provided with tubular spacers 29 and cross arms 30 attached to brackets 31 on the pipe support 17. Said rods extend above an upper cross head 32 where they support compression springs 33 adjustable by nuts 34. The cross head 32 is slidable upon said rods and serves as the support to which the upper end of the expansible metal bellows 12 is attached. The lower end of said bellows has a concave central seat 35 for the upper end of an extension of the stem 36 of a two-way valve member 37, provided with upper and lower tapered valve portions cooperating with upper and lower seat members 38, 39 respectively. The stem of the valve slides through an opening in the upper seat member and in the zone of its travel therethrough is provided with a longitudinally extending metering slot or recess 40, the lower end of which is tapered or graduated, as at 41. Between the upper and lower valve seats the valve casing is provided with a chamber 42 in which the valve member 37 travels, said chamber being in communication by a pressure pipe 43 with a suitably supported expansible metal bellows 44. Said bellows serves as the actuator for the valve to be operated, which in the form shown in Fig. 1 is a drainage control valve. Therefore the lower end of the bellows is provided with an abutment seat 45 to receive the upper end of the stem 46 of the drainage controlling valve member 47. Said valve is normally moved toward open position by an adjustable compression spring 48 and is closed by downward movement produced by expansion of the bellows 44. The valve 47 includes the usual cruciform guiding plug 49, above which is a tapered portion 50 cooperating with a seat 51 in the valve casing cross wall.

Reverting to the relay or pilot valve, a chamber 52 in the valve casing above the seat member 38 communicates by a pipe 53 having a restricted orifice 54 with a plug 55 joined to the fitting 56 connecting pipes 5 and 16. Said plug is provided with an extension 57 threaded internally to receive a long threaded purging tube 58 which is consequently adjustable longitudinally and the far end of which enters the steam chamber in pipe 5. Chamber 52 therefore is in communication with the pipe 5, and also communicates with the steam space in the receiver by way of the tube 58.

The chamber 59 below the seat 39 of the relay valve communicates by way of a vent pipe 60 with exhaust, that is, either with the open atmosphere, or, as shown, with the discharge side of the valve 2, so as to lead to the outlet from the drainage control system any liquid or condensate delivered to pipe 60.

The operation is as follows: Let it be assumed that the entire system is in operation with the water in the receiver at the normal water level AA, as shown, and that the trapped chamber 7, the connecting pipe 11 and bellows 12 are properly loaded with a suitable vaporizable liquid, such as water. Under existing conditions, because the water level is not above normal, the drainage valve 2 should be and is closed. It is held closed by the pressure in the bellows 44, coming by way of pipe 43 from the chamber 42, which is in communication by way of the metering groove 40 with pipe 53 leading to the pipe 5 and therefore subject to receiver pressure by way of pipe 16. Also, under existing conditions the steam zone in the pipe 5 above the normal water level AA is effective upon the liquid in the trapped generator chamber 7, and the water in pipe 5 is likewise effective. The existing conditions will continue so long as the water level in the receiver does not rise.

Let us assume now that the water level in the receiver rises a material amount, say to the abnormal high level BB. This fills the inclined portion of pipe 5 with water rising from the cold water well 20 by way of extension 19. The well 20, it will be observed, lies above the lower level of the receiver 1 but nevertheless holds available at all times a quantity of water subject to the cooling effect of the fins 22 and therefore at a relatively low temperature. Consequently, the effect of the cooler water rising into pipe 5 from the water well 20 is to condense the vapor in the trapped generator chamber 7 and reduce the pressure in said chamber and its connected parts, including the expansible metal bellows 12. The latter therefore contracts and the stem of the relay valve is moved upwardly by the effect of the compression spring 61. As soon as valve member 37 moves away from the seat 39 the bellows 44 is vented by way of pipe 43, chamber 42, chamber 59 and pipe 60. Spring 48 therefore preponderates and raises the valve member 47 to open the main discharge valve 2. Valve 37 moves upwardly fairly rapidly and during its movement there may be a whiff of receiver pressure vented from the pipe 5 by way of pipe 53 and metering groove 40 to the chamber 42, but as the valve approaches its seat the tapering metering portion 41 of the groove gradually cuts off the flow of receiver pressure and prevents the valve from slamming to its seat. In the final position valve member 37 is seated upon the upper seat 38 and receiver pressure is cut off from the relay valve chamber 42.

The main valve is held open and receiver pressure of course forces out the liquid in the receiver through the main drainage valve. The level of liquid lowers in both the receiver and in pipe 5 until it reaches a point below the normal water level, say an abnormal low water level CC. As this level is approached the steam zone in pipe 5 increases, thereby subjecting the liquid in the trapped chamber 7 to increasing heat transfer effect from the steam and to a decreasing cooling effect from the water in tube 5. Finally, the steam zone preponderates by its heat transfer effect and vaporizes a sufficient quantity of the liquid in the trapped chamber 7 to produce pressure sufficient to expand the bellows 12, the abutment end 35 of which moves downwardly, preponderating spring 61 and moving the relay valve 37 downwardly. During this movement there is a graduated flow of receiver pressure through the graduated portion 41 of the metering groove to the chamber 42, the flow increasing as the main portion of the groove 40 is reached, and in the final position valve 37 seats upon the lower seat 39, at which point the vent by way of pipe 60 is closed and receiver pressure becomes effective from the chamber 42 by way of pipe 43 in the bellows 44 to expand the same and overcome the spring 48 and thereby seat the main valve member 47 and cut off the discharge of water from the receiver, in which water collects until the cycle is repeated, as before.

During the operation of the cycle, a number of important effects occur.

In the first place, the main valve is actuated and particularly is closed, by receiver pressure, instead of by the pressure generated in the trapped chamber 7. Receiver pressure is usually ample so that the effective area of the bellows 44 may be a minimum, reducing the necessary strength of the yoke and supporting parts therefor, but at the same time insuring at all times ample operating force for the main valve and positive seating thereof, and also avoiding unnecessarily large diaphragms and stronger parts, as is the case when generator pressure is used directly to operate the main valve.

Moreover, this arrangement, by insuring ample working pressure for the main valve, avoids unnecessarily wide fluctuations in water level in the receiver, although the working fluctuation may nevertheless be varied or adjusted within reasonable limits, by simple variation in the pressure of the relay valve operating spring 61 by its adjusting nut 62. This enables the relay valve to be accommodated to various conditions, such as to systems in which the rate of collection of the liquid in the receiver varies. For instance, where a given system is likely to receive large slugs of water in the receiver 1, the spring 61 is adjusted with heavier tension, so that when the water rises in pipe 5 and exerts its cooling effect upon the liquid in the trapped chamber 7 to reduce the pressure in the bellows 12, the preponderating effect of spring 61 is more prompt, thereby evacuating bellows 44 earlier in the cycle and more promptly affording relief for the receiver by way of the main valve 47. Likewise, when collection in the receiver 1 is in smaller amounts or more slowly, the spring 61 may be relieved to slow up its response to open the main valve and drain the receiver.

Bellows 12 is made of such capacity and said bellows and pipe 11 and trapped chamber 7 are so loaded with vaporizable liquid that the bellows will accept the entire volume of vaporizable liquid in the trapped chamber 7 without danger of rupturing or injuring the bellows. The occurrence of extremely high temperatures in the generator therefore produces no deleterious effect, because after all of the liquid is driven out of the trapped chamber toward the bellows increasingly high temperature can produce no further appreciable rise in trapped chamber pressure. Furthermore, the upper end of the bellows is mounted upon the vertically adjustable crosshead 32, which is the relatively fixed abutment against which the bellows operates. Said bellows, of course, moves the valve 37 downwardly to a positive seat. The abutment 32 therefore is made yieldable against the pressure of springs 33 to permit extra expansion of the bellows beyond the valve seating point without injury to any part, and the operation may be regulated and controlled by adjustment of said springs. Of course, pipe 11 may more or less bend or flex to accommodate itself to the rising abutment.

This control system also is self-purging or automatically scavenging, due to the fact that during every complete cycle of opening and closing movements of the valve mechanism there is a flow of vapor from the receiver by way of pipe 16 to the steam space in pipe 5, thence by way of the purging tube 58 to the chamber of the relay valve and thence to the vent tube 60, or first by way of pipe 43 to the bellows 44 and thence back again to the vent pipe 60. The restriction 54 in pipe 53 is chosen of such size or is made adjustable to produce the proper rate of flow along the path mentioned and secure any necessary or desirable time element in passing the wave of pressure to the pilot valve, so that by such restriction any tendency of slamming the valve to its seat is avoided. Each time a pressure wave flows from the receiver to the pilot valve and thence to the venting discharge, it sweeps through the steam space within the generator and takes with it any air or non-condensable gas which might otherwise collect. Consequently, during all operations the steam space in the generator is filled with steam and cannot collect air and so reduce the heat transfer effects as to render the device inoperative or decrease its efficiency, as is the case with prior constructions. The purging tube 58, of course, may be adjusted longitudinally to more or less enter the steam space and enable it to be accommodated to varying conditions in the rate of collection of air or non-condensable gases and insure complete scavenging by more or less varying the way in which the wave of pressure sweeps through the steam chamber. This arrangement prevents abnormal drop of generator pressure to a point where the main valve is held open until steam flows through and escapes, and also prevents wire drawing of the valve seats.

Another advantage in the use of a relay valve for controlling the main valve is to avoid fluttering of the main valve or wire drawing of the seats. The operation of the main valve by receiver pressure is so positive that complete closing and opening operations of said valve are insured. The valve does not flutter on its seat, and by proper adjustment of the pilot valve spring 61 extreme fluctuations of level of liquid in the receiver may be avoided.

The gooseneck 16 which connects the generator to the steam space of the receiver is of advantage because when the level of liquid in the receiver rises above the mouth where the gooseneck 16 enters the pipe 17, then said gooseneck is in effect an upwardly arched chamber containing a trapped quantity of steam or vapor subject to the cooling effect of the outside atmosphere. Indeed, the gooseneck may be finned or otherwise provided with cooling means if desired. The result is that when said mouth is water sealed by the rising liquid the vapor in the gooseneck rapidly condenses and more quickly draws up into the inclined part of pipe 5 the cooler water in the well 20, with a more prompt response of the generator and condensation of the vapor in its steam space, followed, of course, by a more prompt contraction of bellows 12 and the response thereto by opening of the main valve. The gooseneck therefore does away with considerable of the lagging response of direct connected generator control systems.

The pilot valve mechanism may be assembled and adjusted so that a very small movement of said pilot valve will subject the bellows 44 either to the effect of the maximum pressure in the receiver or to complete collapse by connecting it to the vent pipe, and said movement may be produced by a very small change in pressure in the trapped generator chamber 7. This eliminates wire drawing the seats of the main valve and insures that the control system will take care of what otherwise would cause flooding of the receiver with excess water. Moreover, it enables the control system to be adapted for other uses, one such use being as a control for a feed water regulator, as shown in Fig. 4. In a drainage control system, when the level of liquid in the receiver rises, the main valve 2 should be opened to permit the rising water to flow away. The feed water regulator differs chiefly from a drainage control system in that when the level of water in the boiler rises the main valve in the water supply line should be either restricted or closed to decrease the water supply. In other words, both control systems are controlled by variations in the level of liquid in the tank, either the receiver or the boiler, but in one case the discharge valve is opened and in the other case the supply valve is closed.

Fig. 4 illustrates a water regulator provided with a main supply valve 65 actuated by the bellows 44, so that upon expansion of said bellows the valve is opened rather than closed. This control system is shown connected to a special boiler 66 of the multiple water tube variety intended to be heated by exhaust gases produced from an intermittent metallurgical or furnace operation. It may be assumed that the fire effective upon said tubes plays upon them for an interval of five minutes and then is cut off for an interval of one minute, and so on. When the fire is effective upon the tubes ebullition is very violent and the water level rises a very material height with a rapid production of steam. Between successive applications of the flame to the boiler the water level drops out of sight, as it were, and it is during this period that it is desirable to supply or feed water to the boiler. Control devices for this purpose have not functioned efficiently due to the lag in operation, the response being so tardy that the supply of water to the boiler may be delayed until the next heat and occurs during the heat instead of between heats.

By the present system the control devices are of the same form illustrated at the left in Fig. 1 and require no particular or detailed description. It is sufficient to say that when the level of water in the boiler drops at the end of the heat, practically the full length of the inclined pipe 5 is emptied of water, exposing the entire length of the trapped chamber to the steam in pipe 5 and immediately producing expansion in the trapped chamber with a quick opening of the pilot valve and a rapid flow of pressure from the boiler by way of gooseneck 16, pipe 53 and chamber 42 to the bellows 44, which moves over and fully and widely opens the main valve 65, immediately supplying water. As soon as the next heat occurs water rises in the boiler and also in the pipe 5, which is promptly filled with cooler water coming from the well 20, which immediately produces condensation in the trapped chamber with a reverse operation of the pilot valve and a quick closing of the main valve. Such a system, applied for feed water regulation, is almost instantly responsive to rise and fall of water in the boiler and will supply feed water whenever the boiler water level falls.

Other advantages of the invention will be apparent to those skilled in the art.

What I claim is:

1. The combination of a container for water and steam, a generator spanning the normal water level therein and having a pipe communicating with the steam and water spaces in said container and a trapped generator chamber member in heat conducting relation with said pipe, valve means controlling the water level in said container, a movable abutment for actuating said valve, connecting means for applying the effect of container pressure to said abutment, and means controlled by variations in the pressure in said trapped chamber for varying the application of said effect to said abutment for regulating actuation of said valve means.

2. A combination of the character described in claim 1, in which said connecting means conducts container pressure for effecting said abutment by way of the steam space in the pipe of said generator, to thereby purge the same of air or non-condensable gases.

3. The combination of a container for water and steam, a generator spanning the normal water level therein and including a pipe communicating with the steam and water spaces in said container and a trapped generating chamber member in heat conducting relation with said pipe, valve mechanism actuated by variations in the pressure in said trapped chamber, and means for purging the steam space in said pipe of air or non-condensable gases during each operation of said valve mechanism.

4. The combination of a container for water and steam, a generator spanning the normal water level therein and including a pipe communicating with the steam and water spaces in said container and a trapped generating chamber member in heat conducting relation with said pipe, valve means communicating with the steam space in said pipe for venting the same, and automatic means for actuating said valve means.

5. The combination of a container for water and steam, a generator spanning the normal water level therein and including a pipe communicating with the steam and water spaces in said container and a trapped generating chamber member in heat conducting relation with said pipe, valve means communicating with the steam space in said pipe for venting the same, and automatic intermittently actuating means for operating said valve means.

6. The combination of a container for water and steam, a generator spanning the normal water level therein and including a pipe communicating with the steam and water spaces in said container and a trapped generating chamber member in heat conducting relation with said pipe, valve means communicating with the steam space in said pipe for venting the same, and means actuated by variations in pressure in said trapped generating chamber for actuating said valve means.

7. The combination of a container for water and steam, a generator spanning the normal water level therein and including a pipe communicating with the steam and water spaces in said container and a trapped generating chamber member in heat conducting relation with said pipe, valve means communicating with the steam space in said pipe for venting the same, and means actuated in accordance with variations in level of the liquid in said container for actuating said valve means.

8. The combination of a container for water and steam, a generator spanning the normal water level in said container and including a pipe communicating at its lower end with the water space in said container and at its upper end being provided with an upwardly arched gooseneck communicating with the steam space in said container and also with a vent pipe, said generator also having a trapped generating chamber member in heat conducting relation with said pipe, and valve mechanism controlling the flow through said vent pipe and actuated by variations in pressure in said trapped chamber.

9. The combination of a container for water and steam, a generator spanning the normal water level therein and including a pipe communicating with the steam and water spaces in said container and a trapped generating chamber member in heat conducting relation with said pipe, and a valve controlled vent pipe having a purging member entering the steam space in said pipe, to thereby purge said space of air or non-condensable gases by actuation of the valve to open the vent pipe.

10. A combination of the character described in claim 9, in which said purging member is adjustable to open at various levels in the steam space of said generator pipe.

11. A generator control unit for regulating the water level in containers, comprising a conduit adapted for connection to a container in vertical position and in standard relation with and spanning its normal water level, generating control means in fixed relation with said conduit, including a pipe communicating with the steam and water spaces of said conduit and lying at a definite inclination to the vertical, a trapped generating chamber member associated in heat conducting relation with said pipe, a frame attached to said conduit, a valve and a movable abutment carried by said frame, and a conduit connecting said trapped generating chamber and movable abutment for actuating the latter, whereby said unit with its conduit, generator, movable abutment and valve parts may bodily be installed in or removed from a container system.

12. A generator control unit for regulating the water level in containers, comprising a conduit adapted for connection to a container in vertical position and in standard relation with and spanning its normal water level, generating control means in fixed relation with said conduit, including a pipe communicating with the steam and water spaces of said conduit and lying at a definite inclination to the vertical, a trapped generating chamber member associated in heat conducting relation with said pipe, a frame attached to said conduit, a valve and a movable abutment carried by said frame, a conduit controlled by said valve and communicating with the steam space in said pipe, and a conduit connecting the movable abutment and generating chamber, whereby said unit with its conduit, generator, movable abutment and valve parts may bodily be installed in or removed from a container system.

13. The combination of a container for water and steam, a generator spanning the normal water level therein and including a pipe communicating with the steam and water spaces in said container and a trapped generating chamber member in heat conducting relation with said pipe, a main valve controlling the level of water in said container, a pilot valve for controlling said main valve, a movable abutment connected to said pilot valve and actuated by variations in pressure in said chamber and adapted upon increase in such pressure to move the pilot valve in one direction, yielding means for moving the pilot valve in the opposite direction, and means for adjusting the tension of said yielding means, said pilot valve being provided with graduated metering means for varying its effect upon the main valve.

In testimony whereof I hereby affix my signature.

JOSEPH M. BARRETT.